United States Patent [19]

Merkle

[11] 4,444,009

[45] Apr. 24, 1984

[54] HYDRODYNAMIC TORQUE CONVERTER

[75] Inventor: Hans Merkle, Stuttgart, Fed. Rep. of Germany

[73] Assignee: Daimler-Benz Aktiengesellschaft, Stuttgart, Fed. Rep. of Germany

[21] Appl. No.: 458,531

[22] Filed: Jan. 17, 1983

Related U.S. Application Data

[63] Continuation of Ser. No. 131,173, Mar. 17, 1980, abandoned.

[30] Foreign Application Priority Data

Mar. 15, 1979 [DE] Fed. Rep. of Germany ....... 2910111

[51] Int. Cl.³ ............................................ F16D 33/16
[52] U.S. Cl. .................................................... 60/358
[58] Field of Search ................................. 60/357, 358

[56] References Cited

U.S. PATENT DOCUMENTS

| 3,324,650 | 6/1967 | Staudenmaier | 60/358 X |
| 3,716,995 | 2/1973 | Peter | 60/358 |
| 4,203,289 | 5/1980 | Muschelknautz | 60/358 |

FOREIGN PATENT DOCUMENTS

| 1266089 | 4/1968 | Fed. Rep. of Germany . | |
| 1246261 | 10/1960 | France | 60/357 |
| 1301881 | 7/1962 | France | 60/358 |

Primary Examiner—Robert G. Nilson
Attorney, Agent, or Firm—Craig & Burns

[57] ABSTRACT

A hydrodynamic torque converter which includes a booster pressure line for introducing a booster pressure into an internal hydrodynamic circuit. An inlet orifice of the booster pressure line into the circuit, arranged in a zone of the outer torus of the converter, has a radius with respect to the converter axis of rotation which is larger than the smallers radius of the outer torus with respect to the converter axis of rotation. The inlet orifice lies at a turbine wheel of the torque converter.

26 Claims, 3 Drawing Figures

HYDRODYNAMIC TORQUE CONVERTER

This is a continuation of application Ser. No. 131,173, filed Mar. 17, 1980.

The present invention relates to a torque converter and, more particularly, to a hydrodynamic torque converter wherein a booster pressure is introduced into the internal hydrodynamic circuit of the converter by a booster pressure line.

A hydrodynamic torque converter of the aforementioned type is proposed in, for example, German Pat. No. 1,266,089 wherein an inlet orifice of the booster pressure line is located in a space of the converter which is without any blades, extending from a point of an outer torus of the converter having the smallest radius with respect to an axis of rotation of the converter to a point of the largest radius of the outer torus with respect to the axis of rotation of the converter. This proposed arrangement is such that the space, without blades, is disposed on one side of a reference plane at right angles to an axis of rotation of the converter; whereas, a pump impeller and a turbine wheel, exposed to centrifugal flow, and a stator or reactor are located on the other side of the reference plane.

In the above-noted proposed construction, the filling of the converter may be arbitrarily altered to affect its power transmission capability by changing the position of the inlet orifice of the booster pressure line relative to the axis of rotation of the converter, by setting the booster pressure, or also by the combined use of both of these measures.

The aim underlying the present invention essentially resides in providing a hydrodynamic torque converter, adapted to have a booster pressure introduced into the internal hydraulic circuit thereof, by which it is possible to attain an automatic adaptation of the torque converter, with respect to transmission capabilities thereof, to the operating conditions of an associated internal combustion engine which is charged by an exhaust gas turbo charger means.

In accordance with advantageous features of the present invention, a hydrodynamic torque converter with an introduction of a booster pressure into the internal hydrodynamic circuit by a booster pressure line is provided wherein an inlet orifice of the booster pressure line into the hydrodynamic circuit, arranged in a zone of an outer torus of the converter having a radius with respect to the axis of rotation of the converter which is larger than the smaller radius of the outer torus with respect to the axis of rotation, which inlet orifice lies at the turbine wheel of the converter.

By virtue of the advantageous features of the torque converter of the present invention, from constructional viewpoints, it is no longer necessary to provide a space without blades in the internal hydrodynamic circuit to accommodate the in orifice of the booster pressure line.

Furthermore, in the torque converter of the present invention, due to the position of the inlet orifice of the booster pressure line at the turbine wheel, the filling of the torque converter is already at a constant booster pressure dependent on the number of revolutions of the turbine wheel in such a manner that, with the turbine wheel at a standstill, that is, in a start-up range of operation of the converter, a high emptying effect occurs, by means of which the power transmission capacity in this operating range is reduced. This reduction is desirable in order to be able to accelerate the internal combustion engine more rapidly from an idling speed to a speed required for a specific charging pressure of the exhaust turbine of the exhaust gas turbocharger means. The level of the rotational speed of the engine is, in the start-up or transitional zone, of predominant influence on the level of the exhaust gas energy. On the other hand, the emptying effect is reduced to an increasing extent with an increasing speed of the turbine wheel, whereby it is possible to obtain, after leaving the start-up range, short filling times and, for the clutch zone of operation, a high power transmission capacity.

To be able to effectively empty the torque converter for the start-up range, advantageously the inlet orifice of the booster pressure line should be arranged at a location of high pressure in the internal hydrodynamic circuit. For this purpose, in accordance with the present invention, the inlet orifice of the booster pressure line is located in proximity of leading edges of the turbine wheel in a zone of the pump wheel outlet wherein a high system pressure occurs.

Advantageously, in accordance with the present invention, the turbine wheel is subjected to centripetal throughflow. By virtue of such an arrangement, the inlet orifice of the booster pressure line is disposed, due to the nature of the converter, on a maximum radius with respect to an axis of rotation of the converter and thus in a zone of higher pressure than if the turbine wheel were to be exposed to a centrifugal throughflow as in conventional torque converters.

In accordance with the present invention, the turbine wheel is disposed symmetrically with the pump impeller relative to a reference plane extending perpendicularly to the axis of rotation of the converter and the inlet orifice lies in a zone of the radius of the outer torus which is the largest with respect to the axis of rotation. By virtue of this advantageous construction, the inlet orifice of the booster pressure line lies in a zone of the highest pressure occurring in the internal hydrodynamic circuit, whereby, with a corresponding lowering of the booster pressure, an almost complete emptying of the torque converter can be attained in the start-up range of operation.

In accordance with further advantageous features of the present invention, the booster pressure is variable in dependence upon the rotational speed of the pump impeller. By virtue of this feature, it is possible to achieve an automatic control of the degree of filling of the converter in dependence upon the operating condition of the internal combustion engine since the pump wheel speed is usually proportional to the speed of the main or crankshaft of the internal combustion engine.

Advantageously, according to the present invention, the booster pressure increases with an increasing speed of the pump impeller whereby the degree of filling of the torque converter is controlled through the internal combustion engine so that, during a transition from the start-up range to the clutch range, the highest degree of filling of the torque converter is set.

According to the present invention, the booster pressure line is in constant communication with another inlet orifice into the internal hydrodynamic circuit. By virtue of this arrangement, an external circulation of the operating fluid of the torque converter is provided by way of which heat losses can be removed. In this connection, it is assumed of course that the second inlet orifice of the booster pressure line is located at a point of lower pressure as compared with the pressure at the first inlet orifice.

Advantageously, a heat exchanger, operatively interposed between the two inlet orifices, is connected to the booster pressure line to remove higher amounts of heat losses.

To attain a rapid filling of the torque converter toward the end of the start-up range, in accordance with the present invention, a pressure reservoir, subdivided into two pressure chambers by a pressure-transmitting separating means such as, for example, a separating piston, is connected with its one pressure chamber to the booster pressure line and with its other pressure chamber to a control pressure line.

According to the present invention, the control pressure of the control pressure line is variable in dependence upon the speed of the pump impeller whereby it is possible to effect an automatic control for increasing the degree of filling through the operation of the internal combustion engine.

Advantageously, the control pressure of the control pressure line rises with an increasing pump impeller speed whereby the automatic control is carrier out so that the filling is set at its highest level at higher speeds of the main or crankshaft of the internal combustion engine at which the torque converter usually operates in the clutch range.

In accordance with still further features of the present invention, the control pressure of the control line affects a pressure-maintaining valve arranged downstream of an external pressure source such as, for example, a pressure medium pump, in such a way that, with the pressure chamber being emptied, the pressure medium pump conveys operating medium into the booster line and, with the pressure chamber being filled, a portion of the operating medium is discharged from the operating cycle by way of the pressure maintaining valve into a sump. By virtue of these features, the pressure maintaining valve cannot impair the control of the degree of filling in dependence upon the rotational speed.

In accordance with yet additional features of the present invention, the turbine wheel includes a booster pressure chamber enclosed between an outer cover shell rotating with its turbine wheel and the housing shell of the turbine wheel holding the turbine wheel blades in a zone of the outer torus. The booster pressure chamber is in communication, at one point by way of, for example, a duct, in the proximity of the converter axis of rotation, with the booster pressure line and, by way of the inlet orifice lying at the point of higher pressure with the internal hydrodynamic circuit.

Accordingly, it is an object of the present invention to provide a hydrodynamic torque converter which avoids, by simple means, shortcomings and disadvantages encountered in the prior art.

Another object of the present invention resides in providing a hydrodynamic torque converter which automatically adapts the transmission capabilities of the torque converter to the operating conditions of a supercharged internal combustion engine.

Yet another object of the present invention resides in providing a hydrodynamic torque converter which attains a high power transmission capacity in a clutch zone operation of the converter.

A further object of the present invention resides in providing a hydrodynamic torque converter which enables a rapid acceleration of an associated internal combustion engine from an idling speed to a predetermined speed required for specific charging pressures for the internal combustion engine.

A still further object of the present invention resides in providing a hydrodynamic torque converter which has a booster pressure introduced into an internal hydrodynamic circuit thereof.

Another object of the present invention resides in providing a hydrodynamic torque converter which has an automatic control of the degree of filling thereof in dependence upon an operating condition of an associated internal combustion engine.

A further object of the present invention resides in providing a hydrodynamic torque converter which is simple in construction and therefore relatively inexpensive to manufacture.

Yet another object of the present invention resides in providing a hydrodynamic torque converter which functions realiably under all operating conditions.

These and other objects, features, and advantages of the present invention will become more apparent from the following description when taken in connection with the accompanying drawings which show, for the purposes of illustration only, one embodiment in accordance with the present invention, and wherein.

Figure 1:
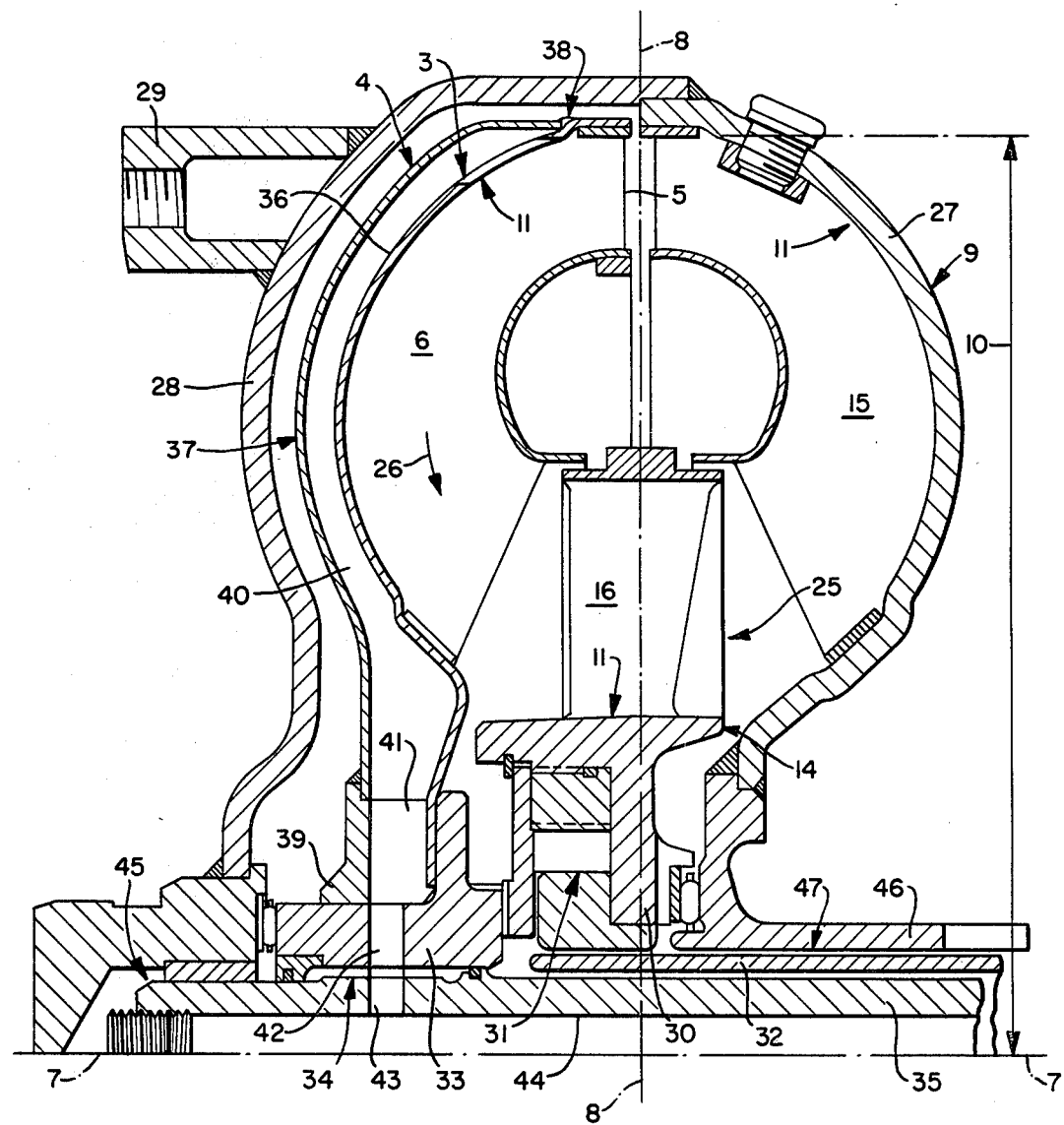
FIG. 1 is an axial vertical cross-sectional view, extending through an axis of rotation, of a hydrodynamic torque converter in accordance with the present invention.

Referring now to the drawings wherein like reference numerals are used throughout the various views to designate like parts and, more particularly, to FIG. 1, according to this Figure, a hydrodynamic torque converter includes a turbine wheel generally designated by the reference numeral 4, a pump impeller generally designated by the reference numeral 9, and a stator or reactor generally designated by the reference numeral 25. The turbine wheel 4 and the pump impeller 9 are arranged symmetrically with respect to a plane 8—8 extending perpendicular to the axis of rotation 7—7 of the converter in such a way that the turbine wheel 4 is exposed to a centripetal through flow in a direction of the arrow 26.

An external housing shell 27 of the pump impeller 9 is welded together with a drive shell 28 extending over the turbine wheel 4. The drive shell 28 may be affixed by, for example, welded-on connecting pipes or tubes 29 to the crankshaft of an internal combustion engine (not shown) for rotation therewith. The stator or reactor 25 is provided with a hub 30 which may be attached by, for example, a freewheel clutch generally designated by the reference numeral 31 to a non-rotating stator shaft 32 in the opposite drive direction of rotation. The turbine wheel 4 is provided with a hub part 33 rotating therewith. The hub part 33 is connected for rotation by way of, for example, a spline connection generally designated by the reference numeral 34, with a turbine wheel shaft 35 leading to a change-speed transmission (not shown) connected after or downstream of the torque converter.

An outer torus generally designated by the reference numeral 11 of the hydrodynamic circuit is formed by the inner surface or jacket of the outer housing shell 27 of the pump impeller 9, by an inner surface or jacket of an outer housing shell 36 of the turbine wheel 4, and by an outer surface or jacket of the hub 30 of the stator 25.

The internal hydrodynamic circuit is forceably produced by the turbine wheel blades 6, fixed with respect to the housing shell 36, by stator blades 16, fixed with respect to the hub 30, and by pump impeller blades 15, fixed with respect to the outer housing shell 27, all of which are transversed in succession in the flow direction indicated by the arrow 26.

To form a booster pressure chamber 40, a cover shell generally designated by the reference numeral 37 is attached to the outer housing shell 36 of the turbine wheel 4 with the cover shell 37 emanating from a point generally designated by the reference numeral 38 at which the torus 11 has its greatest radius 10 with respect to the axis of rotation 7—7 of the converter. The cover shell 37, at a radially inner end, is sealingly connected to the hub 33 by means of a hub part 39. The hub part 39 is provided with a duct 41 opening toward the booster pressure chamber 40 and being in alignment with a radial duct 42 provided in the hub 33.

Figure 2:
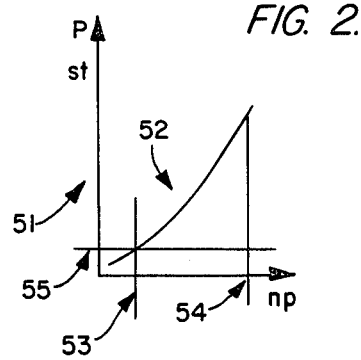
FIG. 2 is a switching diagram illustrating the control of the degree of filling of the hydrodynamic torque converter of FIG. 1.

The turbine wheel shaft 35 has a central duct 44 closed at its one end generally designated by the reference numeral 45 with the duct 44 being in open communication with the radial duct 42 in the hub 33 by a radial duct 43 provided in the turbine wheel shaft 35. The central duct 44 of the turbine wheel shaft 35 is connected, in a manner not illustrated, to a booster pressure line or conduit 12 (FIG. 2). Inlet orifices 3 are arranged in a zone of the largest radius 10 of the outer housing shell 36 of the turbine wheel 4, by means of which the booster pressure chamber 40 is in communication with the inner hydrodynamic circuit forceably produced by the turbine wheel blades 6, pump impeller blades 15, and stator blades or vanes 16.

An annular duct generally designated by the reference numeral 47 is provided between a hub part 46 of the outer housing shell 27 of the pump impeller 9 and the stator shaft 32. The annular duct 47 is in communication, in a manner not illustrated in detail, with a pressure line or conduit 13 (FIG. 3) and, by way of a further inlet orifice generally designated by the reference numeral 14 arranged between the hub 30 of the stator 35 and the outer housing shell 27, with the inner hydrodynamic circuit produced by the blades 6, 15 and 16. The pressure line or conduit 13 connects the further inlet orifice 14 with the radially outwardly disposed inlet orifice 3. The further inlet radius 14 is on a smaller orifice with respect to the axis of rotation 7—7 of the converter than the outer inlet orifice 3 so that, due to a pressure gradient between these two points of the hydrodynamic circuit, a constant external circulation of the hydraulic operating medium is maintained between the inlet orifice 3, by the pressure line or conduit 13, FIG. 3, and booster pressure line 12, to the inlet orifice 14.

Figure 3:
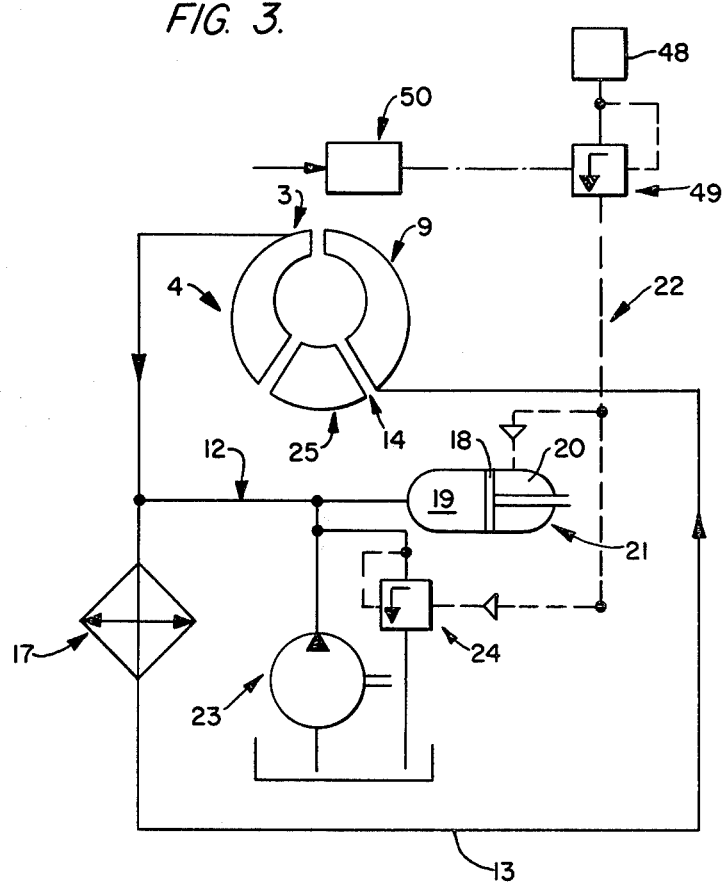
FIG. 3 is a schematic view of a control arrangement for the hydrodynamic torque converter of FIG. 1.

As shown in FIG. 3, a pressure-maintaining valve generally designated by the reference numeral 24 is connected to the booster pressure line 12. The valve 24 is supplied by a pressure pump generally designated by the reference numeral 23 and secures a minimum value for the booster pressure in the booster pressure line 12. Furthermore, a pressure chamber 19 of a pressure reservoir generally designated by the reference numeral 21 is connected to the booster pressure line 12. The pressure reservoir 21 has an additional second pressure chamber 20 separated from the first pressure chamber by a pressure-transmitting separating means such as, for example, a separating piston 18. The second pressure chamber 20 is connected to a control pressure line generally designated by the reference numeral 22, the pressure of which is adjusted by a control valve generally designated by the reference numeral 49 supplied by a pressure source 48. The control valve 49 is acted upon by a device generally designated by the reference numeral 50 which operates in dependence upon the number of revolutions $n_p$ of the pump impeller 9 and thus on the speed of the crankshaft of the internal combustion engine in such a way that the control pressure in the control pressure line 22, as shown schematically in FIG. 2, increases according to a curve generally designated by the reference numeral 52 with an increasing number of revolutions of the pump impeller 9. In the graph of FIG. 2, the control pressure $P_{st}$ of the control pressure line is plotted over the speed $n_p$ of the pump impeller 9. On the abscissa of the diagram in FIG. 3, the idling speed is generally designated by the reference numeral 53 and the full-load speed of the internal combustion engine is generally designated by the reference numeral 54. On the ordinate axis of the diagram of FIG. 3, the reference numeral 55 denotes approximately atmospheric pressure.

To remove relatively large amounts of heat losses, as shown in FIG. 3, a heat exchanger generally designated by the reference numeral 17 may be disposed in the pressure line or conduit 13.

The minimum value of the booster pressure in the booster pressure line 12 is set by the pressure-maintaining valve 24 so that, with the torque converter being emptied, there is still operating fluid in the booster pressure chamber 40 whereby, during a filling of the torque converter, the conduit system of the booster pressure chamber 40 need not be filled.

The pressure maintaining valve 24 is controlled by the control valve 49. With the pressure chamber 19 being emptied, at a time when the pressure in the pressure chamber 20 and the maintaining pressure of the pressure maintaining valve 24 are elevated, the pressure medium pump 23 conveys operating medium into the internal hydrodynamic or hydraulic circuit produced by the blades 6, 15, 16. Conversely, with the internal hydrodynamic circuit being emptied, a portion of the operating fluid flows into the pressure chamber 19 and the other portion is discharged by the pressure maintaining valve 24 into a sump.

In a start-up range of operation of the hydrodynamic torque converter, that is, the range of the idling speed designated 53 in FIG. 3, the internal hydraulic operating circuit is emptied into the pressure chamber 19 of the pressure reservoir 21 since the booster pressure in this range has been set in proximity of its minimum value. With a rising crankshaft speed or an increase in the number of revolutions $n_p$ of the pump impeller 9, the value of the booster pressure is increased by the control valve 49 raising the pressure in the control pressure line 22. As a result thereof, the separating piston 18 displaces the hydraulic operating fluid to the same extent from the pressure chamber 19 into the inner hydrodynamic circuit of the converter. The adjustment is such that, in a clutch range of operation, where the turbine wheel 4 and the pump impeller 9 exhibit approximately the same speed, the internal hydrodynamic circuit is completely filled and thus the torque converter has been brought to its maximum power transmission capacity.

Instead of a cover shell 37, it is also possible in accordance with the present invention, to provide pipe connections or other conduit connections between the inlet orifice 3 and the duct 42 of the hub 33. To better utilize a damming-up effect, baffle means may be provided at the inlet orifice 3 projecting into a region of the turbine wheel blades 6. However, a significant point of the present invention is that the inlet orifice 3 lies at the turbine wheel 4 to attain an additional effect, dependent upon the speed, upon the booster pressure in the booster pressure line 12 for, with an increasing speed of the turbine wheel 4, the pressure in the booster pressure chamber 40, counteracting the emptying action and caused by the centrifugal force, will rise correspondingly so that the booster pressure is the highest when the turbine wheel 4 is at a standstill but is lowest when the hydrodynamic torque converter is operating in the clutch range.

Thus, by means of the features of the present invention, an automatic control of the degree of filling of the torque converter is made possible. The function of the pressure chamber 20 of the pressure reservoir 21 is to accelerate the filling up of the torque converter when changing over from the start up range into the clutch range of operation.

Independently of the fact of whether the flow through the turbine wheel 4 is centripetal or centrifugal, it is advantageous to arrange the inlet orifice 3 in proximity of leading edges 5 of the turbine wheel blades 6. In this manner, the inlet orifice 3 is always disposed in proximity of the outlet of the pump impeller 9. In any event, a high system pressure is obtained in a zone of the outlet of the pump impeller 9 so that, by means of lowering the booster pressure, an effective emptying of the converter is made possible.

The conduit connection between the inlet orifice 3 and the central duct 44 of the tubine wheel shaft 35 in the form of a booster pressure chamber 40 with a wide throughflow cross section results in a lower pressure loss than if the conduit connection were formed by one or several pipes having a relatively narrow throughflow cross section.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A hydrodynamic torque converter which includes a turbine rotor, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being in a zone of the outer torus at a radial position with respect to an axis of rotation of the converter which position has a radius which is larger than a smallest radius of the torus with respect to the axis of rotation of the converter, characterized in that the inlet means are disposed through a wall of the turbine rotor and are connected with the line means for enabling a supplying of the booster pressure in the line means into the internal hydrodynamic circuit.

2. A hydrodynamic torque converter according to claim 1, characterized in that the turbine rotor includes a plurality of blades, and in that the inlet means is arranged in proximity to leading edges of the blades of the turbine rotor.

3. A hydrodynamic torque converter according to one of claims 1 or 2, characterized in that the turbine rotor is subjected to a centripetal throughflow.

4. A hydrodynamic torque converter according to claim 1, characterized in that the turbine rotor is disposed symmetrically to the pump impeller with respect to a plane extending perpendicular to the axis of rotation of the converter, and in that the inlet means is disposed in a zone of the outer torus which has the largest radius with respect to the axis of rotation of the converter.

5. A hydrodynamic torque converter according to one of claims 1, 2, or 4, characterized in that means are provided for varying the booster pressure in dependence upon a rotational speed of the pump impeller.

6. A hydrodynamic torque converter according to claim 5, characterized in that said means for varying the booster pressure are operable to increase the booster pressure with an increase in the rotational speed of the pump impeller.

7. A hydrodynamic torque converter according to claim 6, characterized in that a further inlet means is in communication with the internal hydrodynamic circuit, and in that means are provided for maintaining said inlet means and said further inlet means in constant communication.

8. A hydrodynamic torque converter according to claim 7, characterized in that a heat exchanger means is interposed between said inlet means and said further inlet means and is connected to the line means.

9. A hydrodynamic torque converter according to one of claims 1 or 2, characterized in that a further inlet means is in communication with the internal hydrodynamic circuit, and in that means are provided for maintaining said inlet means and said further inlet means in constant communication.

10. A hydrodynamic torque converter according to one of claims 1 or 2, characterized in that a further inlet means is in communication with the internal hydrodynamic circuit, means are provided for maintaining said inlet means and said further inlet means in constant communication, and in that a heat exchanger means is interposed between said inlet means and said further inlet means and is connected to said line means.

11. A hydrodynamic torque converter according to one of claims 1 or 2, characterized in that means are provided for varying a control pressure in dependence upon a rotational speed of the pump impeller.

12. A hydrodynamic torque converter according to claim 11, characterized in that said control pressure varying means is operable to raise the control pressure in the control pressure line with an increase in the rotational speed of the pump impeller.

13. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, the inlet means are disposed at the turbine wheel and are connected with the line means for enabling a supplying of the booster pressure in the line means into the internal hydrodynamic circuit, means are provided for varying the booster pressure in dependence upon a rotational speed of the pump impeller, a further inlet means is in communication with the internal hydrodynamic circuit, and means are provided for maintaining said inlet means and said further inlet means in constant communication, a heat exchanger means is interposed between said inlet means and said further inlet means and is connected to the line means, the means for varying the pressure includes a control pressure line, a pressure reservoir means is provided, pressure transmitting means are disposed in the pressure reservoir means for separating the pressure reservoir means into two pressure chambers, one of the pressure chambers is connected to the line means and the other pressure chamber is connected to the control pressure line, characterized in that means are provided for varying a control pressure of the control pressure line in dependence upon a rotational speed of the pump impeller.

14. A hydrodynamic torque converter according to claim 13, characterized in that said control pressure varying means is operable to raise the control pressure in the control pressure line with an increase in the rotational speed of the pump impeller.

15. A hydrodynamic torque converter according to claim 14, with an external pressure medium source, characterized in that the means for varying the booster pressure includes a pressure maintaining valve means arranged downstream of the external pressure medium source, said pressure maintaining valve means being operable to enable the external pressure medium source to convey pressure medium into the line means when the pressure chamber connected to the line means is being emptied and to enable a discharge of pressure medium from the internal hydrodynamic circuit into a sump when the last-mentioned pressure chamber is filled with a pressure medium.

16. A hydrodynamic torque converter according to claim 15, characterized in that the pressure medium source is a pressure medium pump.

17. A hydrodynamic torque converter according to claim 15, characterized in that an outer shell is connected to the turbine wheel for rotation therewith, the turbine wheel includes a housing shell holding the blades of the turbine wheel, the line means includes a booster pressure chamber enclosed between the outer shell and housing shell, and means disposed in proximity to the axis of rotation of the converter for communicating the booster pressure chamber with the external pressure medium source.

18. A hydrodynamic torque converter according to claim 17, characterized in that the torque converter further includes a stator, the means for defining the outer torus of the internal hydrodynamic circuit includes an inner surface of the housing shell of the turbine wheel, an inner surface of an outer housing shell of the pump impeller, and an outer surface of a hub of the stator.

19. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, the inlet means are disposed of the turbine wheel and are connected with the line means for enabling a supplying of the booster pressure in the line means into the internal hydrodynamic circuit, characterized in that an outer shell is connected to the turbine wheel for rotation therewith, the turbine wheel includes a housing shell holding the blades of the turbine wheel, the line means includes a booster pressure chamber enclosed between the outer shell and the housing shell, and means disposed in proximity to the axis of rotation of the converter for communicating the booster pressure chamber with an external pressure medium source, and in that the inlet means is disposed at a point of the outer torus which has the largest radius with respect to the axis of rotation of the converter.

20. A hydrodynamic torque converter according to claim 19, characterized in that the torque converter further includes a stator, the means for defining the outer torus of the internal hydrodynamic circuit includes an inner surface of the housing shell of the turbine wheel, an inner surface of an outer housing shell of the pump impeller, and an outer surface of a hub of the stator.

21. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, characterized in that the inlet means are disposed at the turbine wheel and are connected with the line means for enabling a supplying of the booster pressure in the line means into the internal hydrodynamic circuit;

the turbine wheel includes a plurality of blades;

the inlet means is arranged in proximity to leading edges of the blades of the turbine wheel, and means are provided for varying the booster pressure in dependence upon a rotational speed of the pump impeller, said means for varying the booster pressure are operable to increase the booster pressure with an increase in the rotational speed of the pump impeller, a further inlet means is in communication with the internal hydrodynamic circuit, means are provided for maintaining said inlet means and said further inlet means in constant communication, a heat exchanger means is interposed between said inlet means and said further inlet means and is connected to the line means, and the means for varying the pressure includes a control pressure line, a pressure reservoir means is provided, pressure transmitting means are disposed in the pressure reservoir means for separating the pressure reservoir means into two pressure chambers, and one of the pressure chambers is connected to the line means and the other pressure chamber is connected to the control pressure line.

22. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, characterized in that the inlet means are disposed at the turbine wheel and are connected with the line means for enabling a supplying of the booster pressure in the line means into the internal hydrodynamic circuit, the turbine wheel is disposed symmetrically to the pump impeller with respect to a plane extending perpendicular to the axis of rotation of the converter, the inlet means is disposed in a zone of the outer torus which has the largest radius with respect to the axis of rotation of the converter, means are provided for varying the booster pressure in dependence upon a rotational speed of the pump impeller, said means for varying the booster pressure are operable to increase the booster pressure with an increase in the rotational speed of the pump impeller, a further inlet means is in communication with the internal hydrodynamic circuit, means are provided for maintaining said inlet means and said further inlet means in constant communication, a heat exchanger means is interposed between said inlet means and said further inlet means and is connected to the line means, the means for varying the pressure includes a control pressure line, a pressure reservoir means is provided, pressure transmitting means are disposed in the pressure reservoir means for separating the pressure reservoir means into two pressure chambers, and one of the pressure chambers is connected to the line means and the other pressure chamber is connected to the control pressure line.

23. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, characterized in that the inlet means are disposed at the turbine wheel and are connected with the line means for enabling a supplying of the booster pressure in the line means into the internal hydrodynamic circuit, means are provided for varying the booster pressure in dependence upon a rotational speed of the pump impeller, said means for varying the booster pressure are operable to increase the booster pressure with an increase in the rotational speed of the pump impeller, a further inlet means is in communication with the internal hydrodynamic circuit, means are provided for maintaining said inlet means and said further inlet means in constant communication, a heat exchanger means is interposed between said inlet means and said further inlet means and is connected to the line means, the means for varying the pressure includes a control pressure line, a pressure reservoir means is provided, pressure transmitting means are disposed in the pressure reservoir means for separating the pressure reservoir means into two pressure chambers, and one of the pressure chambers is connected to the line means and the other pressure chamber is connected to the control pressure line.

24. A hydrodynamic torque converter according to one of claims 21, 22 and 23 characterized in that the pressure transmitting means is a piston.

25. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, characterized in that the inlet means are disposed at the turbine wheel and are connected with the line means for enabling a supplying of the booster pressure in the line means into the internal hydrodynamic circuit, wherein said line means is mounted to the turbine wheel.

26. A hydrodynamic torque converter which includes a turbine wheel, a pump impeller, means for defining an outer torus of an internal hydrodynamic circuit of the converter, line means for supplying a booster pressure into the internal hydrodynamic circuit, an inlet means communicating with the internal hydrodynamic circuit, the inlet means being arranged in a zone of the outer torus at a radial position with respect to an axis of rotation of the converter which position has a radius which is larger than a smallest radius of the torus with respect to the axis of rotation of the converter, characterized in that the inlet means are disposed at the turbine wheel and are connected with the line means for enabling a supplying of the booster pressure in the line means into the internal hydrodynamic circuit, wherein said turbine wheel is mounted to a hollow shaft and the inlet means are connected with the line means for enabling a supplying through said shaft of the booster pressure in the line means into the internal hydrodynamic circuit.

* * * * *